United States Patent
Geissenhöner

(10) Patent No.: US 8,602,484 B2
(45) Date of Patent: Dec. 10, 2013

(54) CONVERTIBLE HAVING A CONVERTIBLE TOP AND A WINDBREAK DEVICE

(75) Inventor: Kai Geissenhöner, Suhl (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/551,030

(22) Filed: Jul. 17, 2012

(65) Prior Publication Data

US 2013/0020830 A1    Jan. 24, 2013

(30) Foreign Application Priority Data

Jul. 21, 2011 (DE) .......................... 10 2011 052 026

(51) Int. Cl.
*B60J 7/22* (2006.01)

(52) U.S. Cl.
USPC .................................. 296/180.1; 296/107.08

(58) Field of Classification Search
USPC .................. 296/180.1, 180.5, 107.08, 107.09
See application file for complete search history.

(56) References Cited

U.S. PATENT DOCUMENTS

| | | | | |
|---|---|---|---|---|
| 4,592,571 A | * | 6/1986 | Baumann et al. | 280/756 |
| 5,190,343 A | * | 3/1993 | Fischer et al. | 296/180.5 |
| 5,211,718 A | * | 5/1993 | Gotz et al. | 296/180.1 |
| 2002/0089214 A1 | * | 7/2002 | Gloss | 296/180.1 |
| 2003/0020298 A1 | * | 1/2003 | Koch | 296/107.08 |
| 2008/0023984 A1 | * | 1/2008 | Hermann et al. | 296/180.1 |
| 2008/0067834 A1 | * | 3/2008 | Erb et al. | 296/180.1 |
| 2011/0018307 A1 | * | 1/2011 | Rimmelspacher et al. | 296/180.5 |
| 2011/0175402 A1 | | 7/2011 | Schulz et al. | |
| 2011/0291438 A1 | * | 12/2011 | Schulz | 296/107.08 |

FOREIGN PATENT DOCUMENTS

| | | |
|---|---|---|
| CN | 102126419 A | 7/2011 |
| CN | 102126420 A | 7/2011 |
| DE | 102006034445 B3 | 10/2007 |
| DE | 102010005029 A1 | 7/2011 |

OTHER PUBLICATIONS

Search Report from priority application DE102011052026.0, dated Mar. 14, 2012, with partial English translation.

* cited by examiner

*Primary Examiner* — Jason S Morrow
(74) *Attorney, Agent, or Firm* — RatnerPrestia

(57) ABSTRACT

A convertible having a convertible top, a windbreak device, which has at least two windbreak bows which are mounted in pivot axles on the convertible and can be pivoted between a folded-in position of rest (RS) and a folded-out active position (WS) and which are connected to one another via a coupling mechanism underneath their pivoting axes, and having an inner trim which covers the pivot axles. The windbreak device can be activated manually between the position of rest and the active position, the inner trim has a through-opening for linkage of the convertible top, and the through-opening can be closed off or opened by a movable flap, wherein in an open position of the flap, the flap is arranged at least partially under the inner trim, and a blocking element is provided which blocks the manual activation of the windbreak bows if the flap is in the open position.

10 Claims, 4 Drawing Sheets

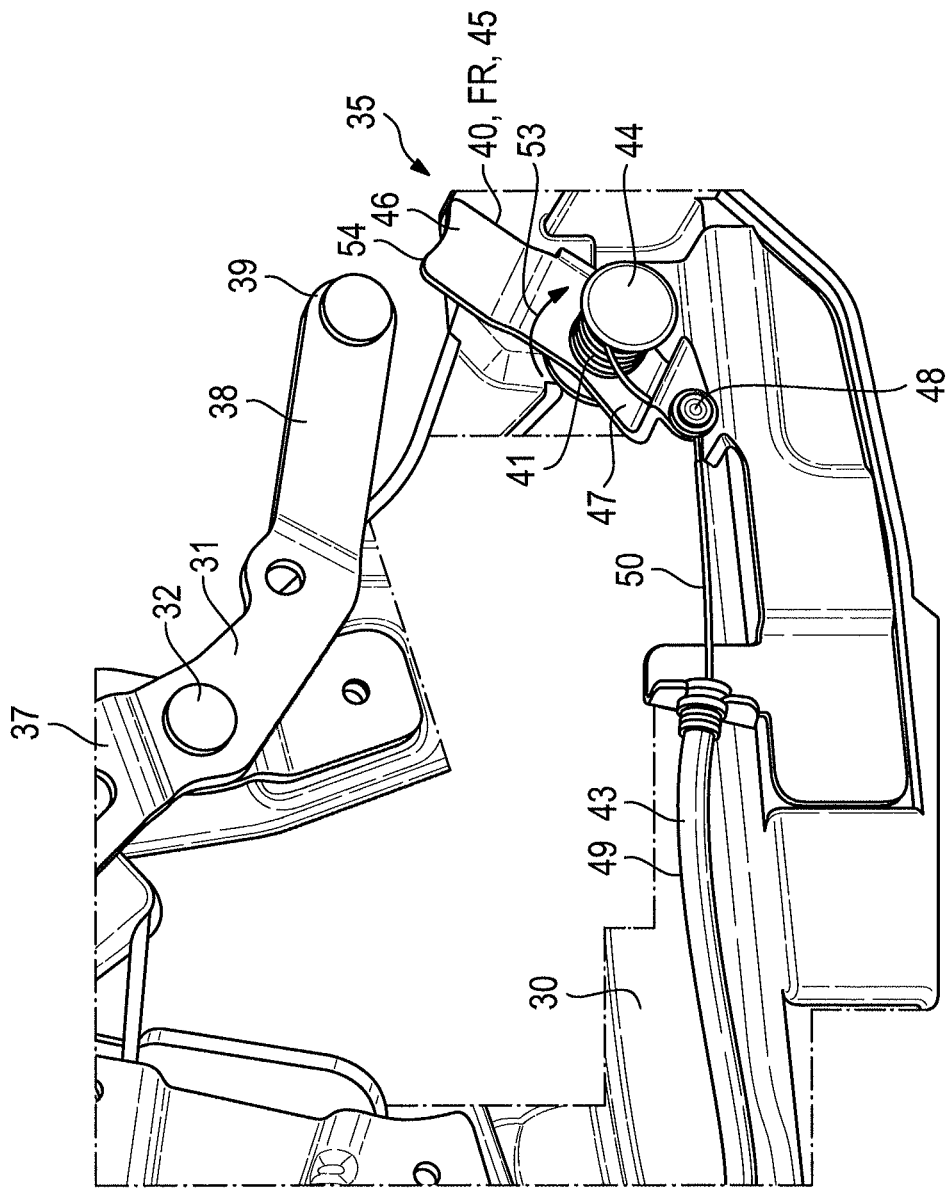

CONVERTIBLE HAVING A CONVERTIBLE TOP AND A WINDBREAK DEVICE

CROSS-REFERENCE TO RELATED APPLICATIONS

This U.S. patent application claims priority to German Patent Application DE 10 2011 052 026.0, filed Jul. 21, 2011, which is incorporated herein by reference in its entirety.

FIELD OF THE INVENTION

The invention relates to a convertible having a convertible top and a windbreak device, which has at least two windbreak bows which are mounted in pivot axles on the convertible and can be pivoted between a folded-in position of rest (RS) and a folded-out active position (WS) and which are connected to one another via a coupling mechanism underneath their pivoting axes, and having an inner trim which covers the pivot axles.

BACKGROUND OF THE INVENTION

Such a convertible is known from DE 10 2006 034 445 B3. The windbreak device has at least two windbreak bows which are mounted on the cabriolet in pivot axles and which can pivot between a folded-in position of rest and a folded-out active position. In the folded-out active position, a flexible surface structure is extended between the rear of the vehicle and the two windbreak bows. The pivot axles of the two windbreak bows lie underneath an inner trim, which is also referred to as rear side trim. So that both windbreak bows can be activated simultaneously, they are connected to one another via a coupling mechanism underneath their pivot axles, with the result that the one windbreak bow entrains the other windbreak bow during the adjustment between the position of rest and the active position. In order to move the windbreak bows, an electric or hydraulic drive is provided.

SUMMARY

An object of the invention is to specify a convertible of the type mentioned at the beginning in which a manual movement of the windbreak device is readily possible.

This object is achieved with a convertible having a convertible top, a windbreak device, which has at least two windbreak bows which are mounted in pivot axles on the convertible and can be pivoted between a folded-in position of rest (RS) and a folded-out active position (WS) and which are connected to one another via a coupling mechanism underneath their pivoting axes, and having an inner trim which covers the pivot axles, wherein the windbreak device can be activated manually between the position of rest and the active position, in that the inner trim has a through-opening for linkage of the convertible top, in that the through-opening can be closed off or opened by a movable flap, wherein, in an open position (OF) of the flap, the flap is arranged at least partially under the inner trim, and in that a blocking element is provided which blocks the manual activation of the windbreak bows if the flap is in the open position (OF). Exemplary embodiments and developments of the invention are the subject matter of the dependent claims.

The advantages which are mainly achieved with the invention are that in a convertible which has, in the inner trim, a through-opening for linkage of the convertible top and a flap which closes off this through-opening, reliable movement of the windbreak by hand or manually is possible without at the same time damaging other components such as, in particular, the flap. According to aspects of the invention, there is therefore provision that the windbreak device with the two windbreak bows can be adjusted manually between the position of rest and the active position only when the flap closes off the through-opening for the linkage. For this purpose, according to aspects of the invention a blocking element permits the windbreak bows to be adjusted only when the flap closes off the through-opening or does not assume the open position. If the flap is in the open position and clears the through-opening, the blocking element prevents the components of the windbreak device and of the coupling mechanism, which are located underneath the inner trim from damaging the flap during a movement.

According to one development of the invention, there is provision that the blocking element can be adjusted to its blocking position by the flap itself, specifically when the flap assumes a position in which the windbreak device must not be adjusted.

An exemplary embodiment in which a movable drive element, which can be activated by the flap, is arranged adjacent to the flap, wherein the drive element activates the blocking element via a connecting device, is particularly preferred. According to this exemplary embodiment, the flap position is therefore directly tapped and therefore the blocking element activated via the drive element and the connecting device.

An exemplary embodiment is preferred in which the drive element is a pivotably mounted drive lever which is moved by the flap and therefore activates the blocking element, in the form of a pivotably mounted blocking link, via the connecting device in the form of a flexible push and/or pull cable. This provides a simple mechanical blocking device for the windbreak bows.

An exemplary embodiment in which in the blocking position the blocking element can be moved into engagement with the blocking mechanism is particularly preferred. As a result, the movement of the two windbreak links is reliably blocked if the flap assumes, in particular, the open position.

Furthermore, an exemplary embodiment is particularly preferred in which the coupling mechanism comprises a coupling link and two connecting links, wherein in each case a connecting link is respectively connected to one of the windbreak bows and to the coupling link. This provides a three-element coupling drive between the two windbreak bows, which is of simple design and activates both windbreak bows with a reliable function, wherein the configuration of the three-element lever mechanism provides the possibility of moving the two windbreak bows through different pivoting angles.

According to one development of the invention, there is provision that the coupling link is pivotably mounted in a carrier, wherein the blocking element is also preferably pivotably mounted on this carrier. This provides a compact structural unit which easily permits the two windbreak bows to be blocked.

Furthermore, an exemplary embodiment in which in the blocking position the blocking link interacts directly with the coupling link is preferred.

Moreover, an exemplary embodiment in which the coupling link is mounted—with respect to the longitudinal extent of said coupling link—approximately centrally on the carrier, wherein a link arm of the coupling link is connected to the two connecting links, and another link arm interacts with the blocking lever, is preferred. This provides secure blocking of the movement of the windbreak bows.

BRIEF DESCRIPTION OF THE DRAWINGS

The invention will be explained in more detail below using exemplary embodiments and with reference to the drawing, in which:

FIG. 4 is a view of a detail of the coupling mechanism with the blocking element in a release position.

DETAILED DESCRIPTION

Figure 1:
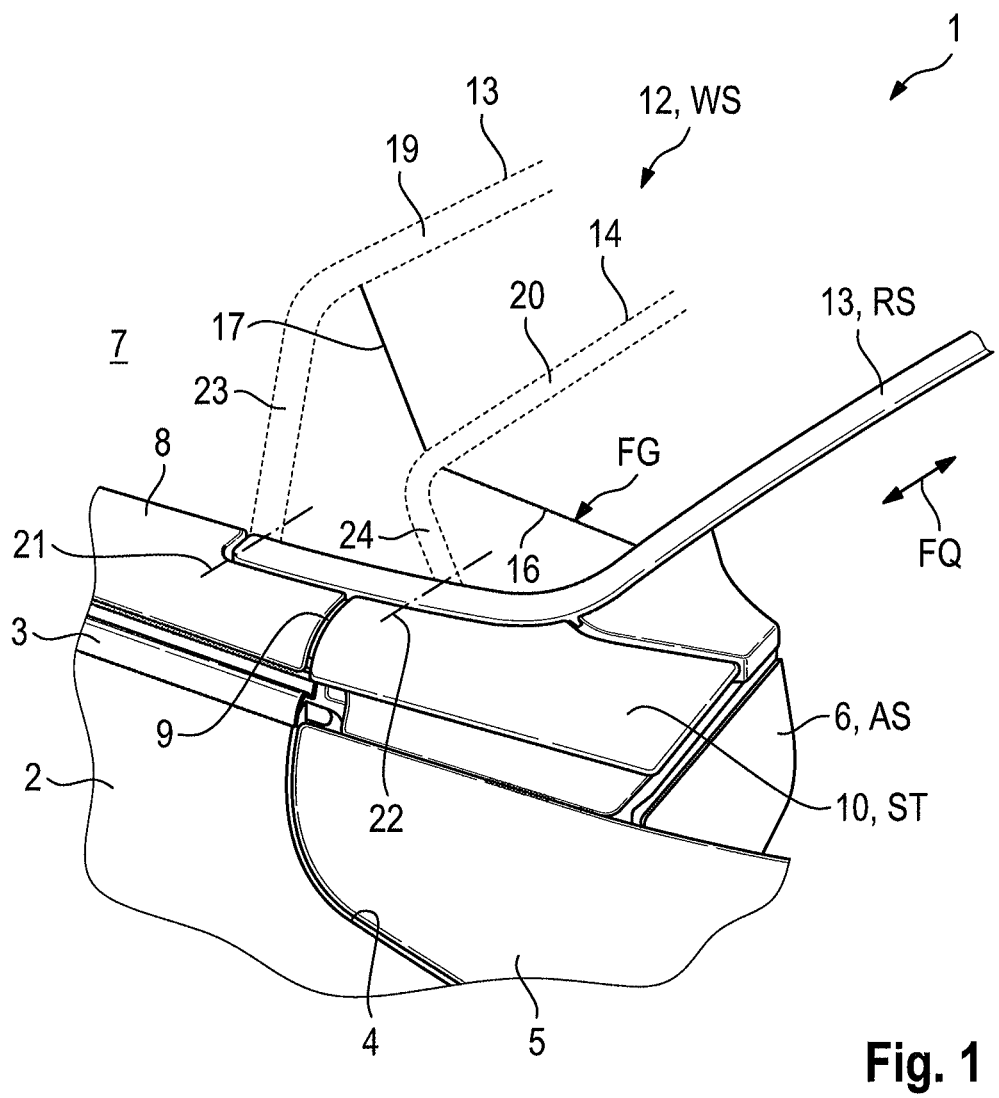
FIG. 1 shows a detail of a convertible having a windbreak device.

FIG. 1 shows, in the form of a detail of a convertible 1, an outer bodywork side wall 2 with a belt line 3 and a rear convertible top box opening 4, which is closed off by a movable convertible top box lid 5 in FIG. 1. In the closed position shown, the convertible top box lid 5 covers, at least partially, a convertible top 6, which is in the storage position AS. The convertible top 6 is adjustable between the storage position shown and a closed position (not shown here) in which it covers a passenger compartment 7 of the vehicle, for which purpose the convertible top has a convertible top linkage (not illustrated here). At the belt line 3, the bodywork side wall 2 is adjoined by an inner trim 8 which closes off or covers the bodywork side wall 2 at the top. A through-opening 9 for the convertible top linkage (not illustrated here) is provided in the inner trim 8, wherein the through-opening in FIG. 1 is closed off by a movable flap 10. The flap 10 is held in a movable fashion at a flap carrier 11 (shown in FIG. 3), with the result that said flap 10 can be moved out of the closed position 51 shown in FIG. 10 into an open position (OF) illustrated by dashes in FIG. 2. In this context, the flap 10 can be moved, on the one hand, by pivoting about a pivot axle (not shown here) and, on the other hand, can be moved linearly along the flap carrier 11, in particular downwards, with the result that in the open position OF it is approximately upright and at the same time arranged at least partially underneath the level of the inner trim 8.

Figure 2:
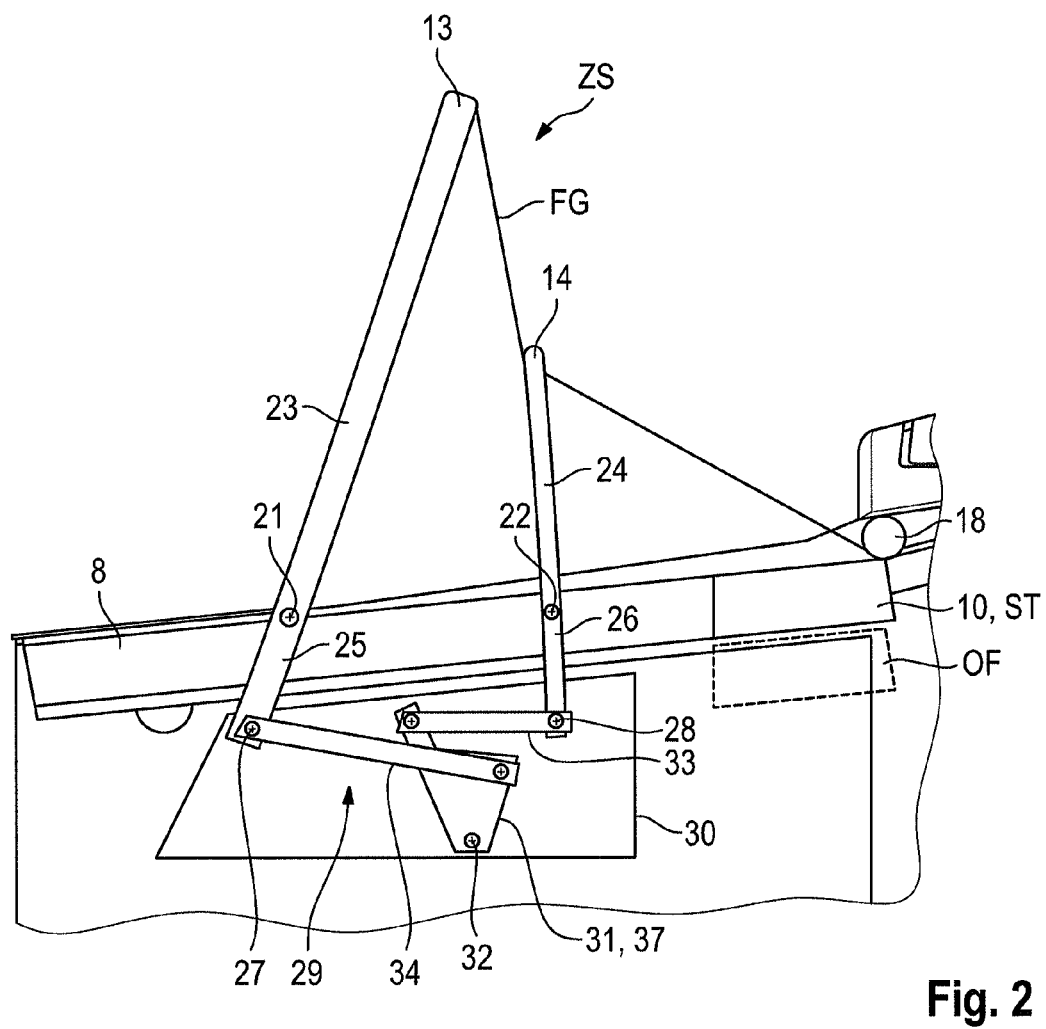
FIG. 2 shows a simplified schematic illustration of the windbreak device having a coupling mechanism.

According to FIG. 1, the convertible 1 still has a windbreak device 12 which, according to FIGS. 1 and 2, has two windbreak bows 13, 14 which can be seen in FIG. 1 in a dashed illustration in a folded-out active position WS, and in a continuous line in a folded-in position of rest RS. In the folded-out active position WS, a flexible surface structure FG is extended at the bows 13, 14, with the result that in the active position WS the windbreak device 12 extends both in an approximately horizontal section 16 and in an approximately vertical section 17 of the surface structure FG. The flexible surface structure FG is preferably implemented as a net-like roller blind which is suspended so that it can be rolled up and unrolled on a rear-side wind shaft 18 (FIG. 2). In this context, the free end of the surface structure FG is attached to a vertically extending base 19 of the front windbreak bow 13. If the windbreak bow 13 is moved out of its position of rest RS into its active position WS, the surface structure FG is hence automatically unwound from the wind shaft 18 and deflected by the base 20 of the rear windbreak bow 14. So that the windbreak bows 13, 14 can be moved between the position of rest RS and the active position WS, they are mounted in a front pivot axle 21 and a rear pivot axle 22, wherein the pivot axles 21 and 22 run in the transverse direction FQ of the vehicle. The front windbreak bow 13 is movably held at the front pivot axle 21, while the rear windbreak bow 14 is movably connected to the convertible 1 at the rear pivot axle 22. The front windbreak bow 13 pivots through approximately 90° between the position of rest and the active position, while the rear windbreak bow 14 pivots through approximately 180°. Each windbreak bow 13, 14 has, in addition to its corresponding base 19, 20, lateral bow limbs 23, 24 which are connected to the pivot axles 21, 22, which is apparent, in particular, from FIG. 2. The pivot axles 21, 22 lie underneath the level of the inner trim 8 and are covered by it. The two bow limbs 20 and 24 extend downwards beyond the pivot axles 21, 22 with one bow section 25, 26 in each case and have a drive connection to one another at their free ends 27, 28 via a coupling mechanism 29 (FIG. 2).

The coupling mechanism 29 comprises a coupling link 31 which is pivotably mounted on a carrier 30 and is connected to the carrier 30 in a pivot axle 32. In each case, a connecting link 33, 34 of the coupling mechanism 29 extends between each free end 27, 28 of the corresponding bow section 25, 26 and the coupling link 31. The two connecting links 33, 34 are each connected in pivot axles both to the free end 27, 28 and to the coupling link 31. This therefore results in a three-element coupling mechanism which, in the case of manual movement of one of the windbreak bows 13, 14, automatically transmits the movement to the other windbreak bow 14, 13 and the latter is entrained in accordance with the transmission ratio in the coupling mechanism. As a result, the windbreak device 12 which is manually adjustable between the position of rest RS and the active position WS can be advantageously operated with one hand, wherein this one-hand operation is preferably carried out by means of the front windbreak bow 13 which is at the top in the position of rest RS (FIG. 1).

The coupling link 31 is mounted about its, with respect to its longitudinal extent, approximately central pivot axle 32, on the carrier 30, with the result that an upper link arm 37 is connected to the two connecting links 33 and 34. Furthermore, the coupling link 31 comprises a lower link arm 38 which has a free end 39.

When the windbreak device 12 moves between the position of rest RS and the active position WS, it becomes clear that, for example, the bow sections 25, 26 and/or parts of the coupling mechanism 29 can extend as far as under the linkage flap 10. In order to prevent movement of the windbreak device 12 when the flap 10 assumes its open position OF in which it comes to rest at least partially under the inner trim 8. For this purpose, a blocking mechanism 35 is provided which will be explained in more detail with reference to FIGS. 3 and 4. Identical or identically acting parts are provided in FIGS. 3 and 4 with the same reference symbols as in FIGS. 1 and 2.

The blocking mechanism 35 has a blocking element 40 which can be adjusted, preferably pivoted, between a blocking position SR (FIG. 3) and a release position FR (FIG. 4). In the blocking position SR, the blocking element 40 interacts with the free end 39 of the coupling link 31 in such a way that it can no longer be adjusted about its pivot axle 36 in the clockwise direction. As a result, a movement of the windbreak bows 13, 14 is also prevented. The blocking element 40 is forced via a spring device 41, in particular limb spring, into one of the two positions (release position FR or blocking position SR), while for the other position the blocking element 40 is activated by means of a drive element 42 which is mounted near to the flap 10. The drive element 42 and blocking element 40 have a drive connection to one another via a connecting device, in particular a flexible force transmission means 43. Generally the following function results for the blocking mechanism 35: if the flap 10 is in the open position OF or alternatively in the closed position ST, the drive element 42 is activated by the flap 10, with the result that the blocking element 40 can be activated into the release position FR, or alternatively into the blocking position SR, via the flexible drive transmission means 43.

Figure 3:
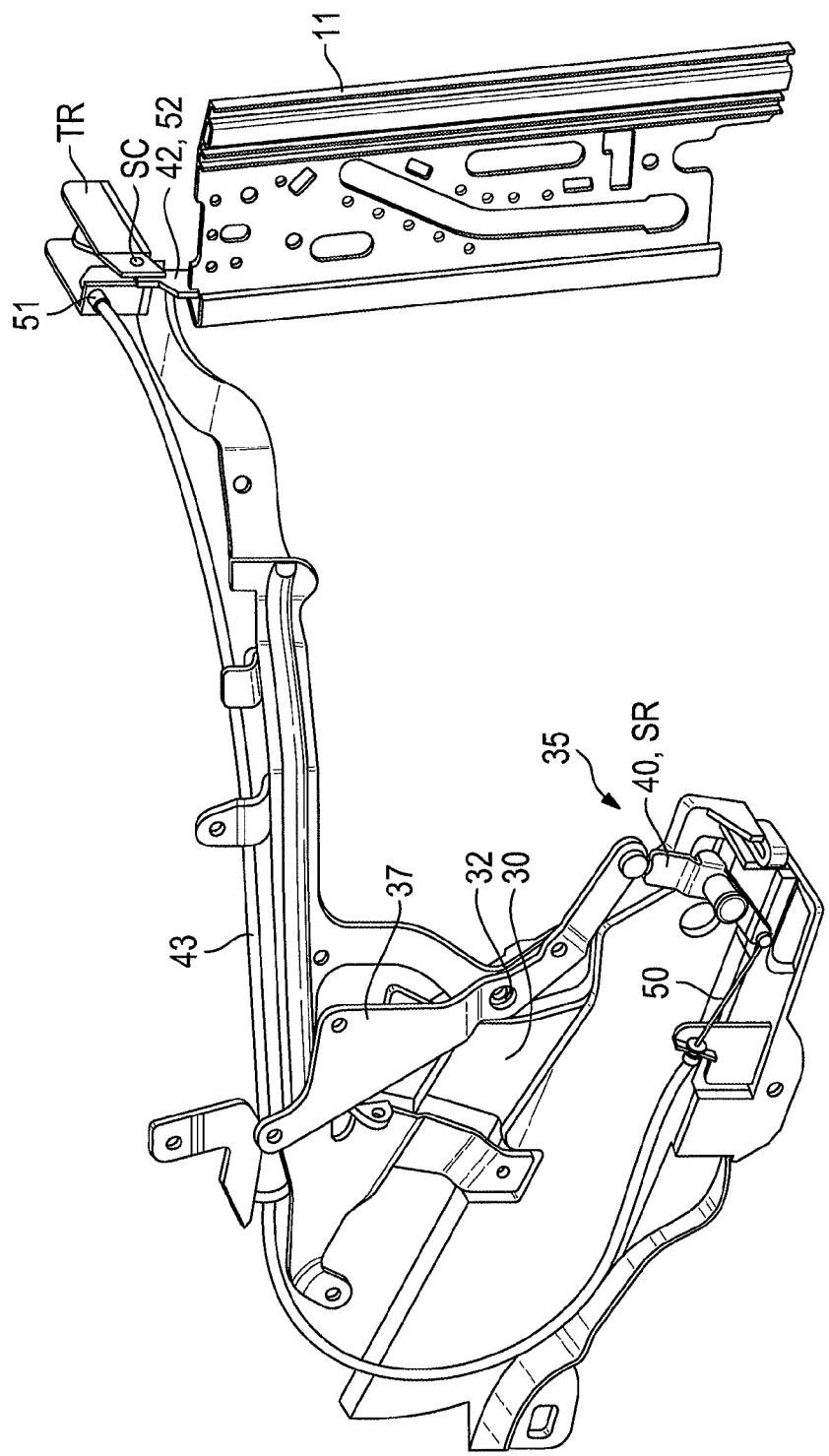
FIG. 3 is an illustration of a detail of the coupling mechanism with a blocking element in the blocking position.

The exemplary embodiment of the blocking mechanism 35 shown in FIGS. 3 and 4 will be explained below in detail. The blocking element 40 is embodied as a blocking lever 45 which is mounted so as to be pivotable about a pivot axle 44 and which has two lever arms 45, 46 which each extend away from the pivot axle 44. The upper lever arm 45 interacts in a blocking fashion with the free end 39 of the lower link arm 38 when the blocking position SR is assumed. The flexible drive transmission means 43, which is embodied here as a push or pull cable and is connected by its end 48 to the lever arm 47 engages on the other lever arm 47. The drive transmission means 43 is preferably embodied as a Bowden cable with an external sheath 49 and a core 50. The other end 51 of the drive transmission means 43 is connected to the drive element 42, as is shown by FIG. 3. The drive element 42 is embodied as a lever 52 which is mounted in a pivotable fashion (pivot axle SC) on a carrier TR, wherein one lever arm interacts with the flap, and the other lever arm is connected to the end 51 of the drive transmission means 43.

For the specific exemplary embodiment, the following function results: if the flap 10 is in the open position OF, the drive element 42 is not acted on, and the flexible drive transmission means 43 is in a relaxed state, with the result that the spring device 41 pivots the blocking element 40 into the blocking position SR and holds it there, as is shown in FIG. 3. If the flap 10 is in the closed position ST which is shown, the drive element 42 is actuated, as a result of which the blocking element 40 pivots in the direction 53 of the arrow from the blocking position SR into the release position SR as a result of pulling on the drive transmission means 43, in which release position FR the lower link arm 38 is released again for a movement of the coupling mechanism 29.

In the exemplary embodiment, a bolt or mushroom pin is located at the free end 39 of the lower link arm 38 and interacts with a correspondingly shaped, front-side end 54 of the blocking element 40 when the blocking element 40 assumes the blocking position SR.

What is claimed:

1. A convertible having a convertible top, a windbreak device, which has at least two windbreak bows which are mounted in pivot axles on the convertible and can be pivoted between a folded-in position of rest (RS) and a folded-out active position (WS) and which are connected to one another via a coupling mechanism underneath their pivoting axes, and having an inner trim which covers the pivot axles, wherein the windbreak device can be activated manually between the position of rest and the active position, in that the inner trim has a through-opening for linkage of the convertible top, in that the through-opening can be closed off or opened by a movable flap, wherein, in an open position (OF) of the flap, the flap is arranged at least partially under the inner trim, and in that a blocking element is provided which blocks the manual activation of the windbreak bows if the flap is in the open position (OF).

2. The convertible as claimed in claim 1, wherein the blocking element can be adjusted to a blocking position (SR) by the flap.

3. The convertible as claimed in claim 1, wherein a movable drive element, which can be activated by the flap, is arranged adjacent to the flap and in that the drive element activates the blocking element via a connecting device.

4. The convertible as claimed in claim 3, wherein the drive element is a pivotably mounted drive lever, the connecting device is a flexible drive transmission means, and the blocking element is a pivotably mounted blocking link.

5. The convertible as claimed in claim 2, wherein in the blocking position (SR) the blocking element can be moved into engagement with the coupling mechanism.

6. The convertible as claimed in claim 5, wherein the coupling mechanism comprises a coupling link and two connecting links, wherein in each case a connecting link is respectively connected to one of the windbreak bows and to the coupling link.

7. The convertible as claimed in claim 6, wherein the coupling link is pivotably mounted on a carrier.

8. The convertible as claimed in claim 1, wherein the blocking element is pivotably mounted on a carrier.

9. The convertible as claimed in claim 6, wherein in the blocking position (SR) the blocking element interacts with the coupling link.

10. The convertible as claimed in claim 6, wherein the coupling link is mounted approximately centrally on a carrier with respect to the longitudinal extent of said coupling link (31), wherein a link arm of the coupling link is connected to the two connecting links, and another link arm interacts with the blocking element.

* * * * *